J. T. ONSTOTT.
TRACTOR CUT-OUT PLOW.
APPLICATION FILED MAY 28, 1917.

1,301,305.

Patented Apr. 22, 1919.

WITNESS:
Bernard Privat

INVENTOR.
Jacob T. Onstott
BY
ATTORNEY.

UNITED STATES PATENT OFFICE.

JACOB T. ONSTOTT, OF YUBA CITY, CALIFORNIA, ASSIGNOR TO ERNEST E. SOWELL, OF SACRAMENTO, CALIFORNIA.

TRACTOR CUT-OUT PLOW.

1,301,305.  Specification of Letters Patent.  Patented Apr. 22, 1919.

Application filed May 28, 1917. Serial No. 171,395.

*To all whom it may concern:*

Be it known that I, JACOB T. ONSTOTT, a citizen of the United States, residing at Yuba City, in the county of Sutter, State of California, have invented certain new and useful Improvements in Tractor Cut-Out Plows; and I do declare the following to be a full, clear, and exact description of the same, reference being had to the accompanying drawings, and to the characters of reference marked thereon, which form a part of this application.

This invention relates to improvements in farm implements and particularly to plows to be drawn by tractors. The object of the invention is to provide a cut out plow which will perform the plowing functions in places where gang plows or other fixed rigid plows cannot operate. My improved plow is designed to be operated alone or in connection with gang plows for the purpose of plowing in close to vines, trees, plants or other similar places. The plow embodies a rigid wheel mounted frame, the wheels being adjustable both as to depth and width. On such rigid frame is a swinging plow beam connected with which is the plow share. The swinging beam is provided with a controlling wheel and gear whereby it may be swung in toward the rigid frame or outwardly therefrom according to what point it is desired to have the plow operate. By means of this structure the plow may be operated close between vines, trees or other growths and when such vines, trees or other growths get in the way of the plow, it may be swung to avoid the same and then after the said trees, vines or other growths are passed, the plow may be placed back in the original line of operation. I also provide an efficient means for adjusting the vertical position of the plow beam itself.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1:
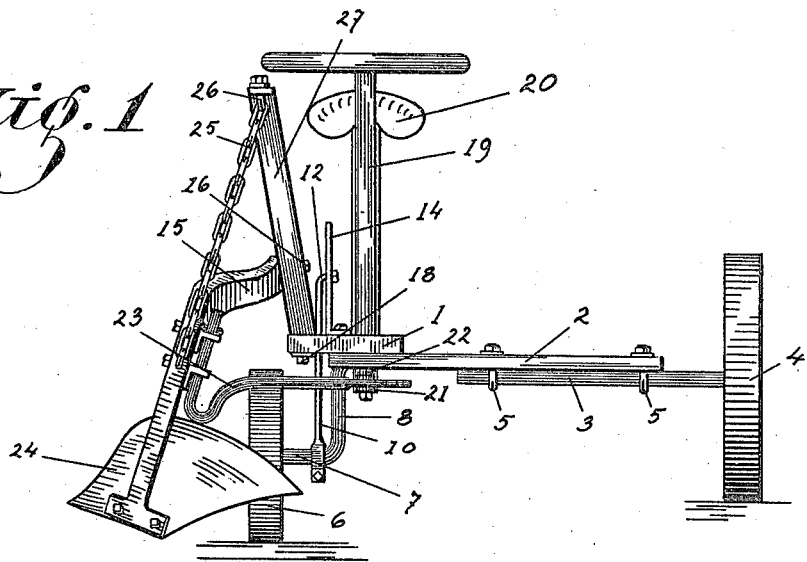
Figure 1 is a rear elevation of the complete plowing device.
Figure 2:
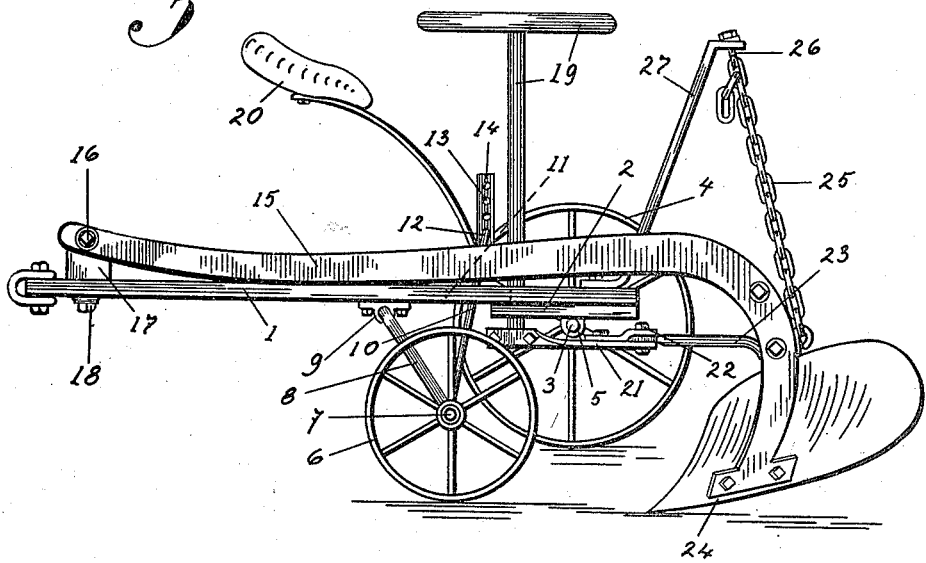
Fig. 2 is a side elevation of the same.

Referring now more particularly to the characters of reference on the drawings, I first provide a main supporting platform or beam 1. At right angles to this beam 1 I provide a beam 2 adjustable longitudinally to which is an axle 3 carrying a land wheel 4. The position of the land wheel 4 may be adjusted by slipping the axle one way or the other through the clamps 5. A furrow wheel 6 is mounted on the axle 7 and has an upwardly extending supporting rod 8 turnably journaled underneath the beam 1 as at 9. An adjusting rod 10 is fastened to the axle 7 and extends vertically through a slot 11 in the beam 1. This rod 10 has a hook 12 on its upper end whereby it may be positioned in any one of a number of holes 13 on a vertical plate 14 bolted to the top of the beam 1. By means of this adjustment the furrow wheel may be set for any depth desired.

The salient feature of my improved plow consists of a plow beam 15, pivoted at 16 for vertical adjustment relative to the beam 1. This pivotal point 16 is on a plate 17 swiveled at the front end of the beam 1 by means of a bolt 18 or other suitable swiveling means. By means of this swivel connection, the beam 15 is susceptible of a horizontal swinging movement relative to the frame 1. This horizontal swinging movement is imparted and controlled by means of a hand wheel and post 19 journaled through the beam 1 at a point adjacent the operator's seat 20. At the lower end of the post 19 is provided an arm 21 clamped thereto, which arm is in turn pivoted as at 22 to a projecting bar 23 swiveled to the beam 15. Thus by turning the post 19 in one direction or the other the beam 15 will be swung horizontally with respect to the beam 1. Therefore since the plow member 24 is carried on the end of the beam 15, it will be likewise swung inwardly or outwardly at the will of the operator for the purposes as will appear from the preamble to this specification. The vertical position of the plow beam 15 and plow share 24 is determined by means of a chain 25 fixed to the beam 15 and adapted to have its links engaged with a hook 26 supported on a bar 27 extending upwardly from the beam 1. By altering the position of the links in the hook 26, this will raise or lower the beam and plow for fixing it for any desired depth. The plow may be reversible so as to throw the furrow in one direction or the other.

From the foregoing description it will be readily seen that I have produced a tractor cut-out plow which may be operated to cut out of a straight line without moving the motive power. The advantages of this will be obvious to one skilled in the art. The plow may be drawn by any motive power found desirable. The various adjustable features for regulating the depth, width or any other relative position of the plow parts gives my farm implement an efficiency far exceeding anything which to my knowledge has been heretofore produced.

From the foregoing description it will readily be seen that I have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claim.

Having thus described my invention what I claim as new and useful and desire to secure by Letters Patent is:

A plow comprising a main wheel-mounted supporting beam, a plow beam pivoted at one end of the supporting beam for horizontal and vertical movement relatively thereof, and a vertical post journaled near the opposite end of the supporting beam, a hand wheel on the post, an arm fixed to the lower end of the post and projecting at right angles thereto, a rigid bar pivoted to the arm and to the plow beam whereby horizontal movement may be imparted to the plow beam with the turning of the hand wheel, and a flexible suspension member between the supporting beam and the plow beam to set and maintain the vertical position of the latter and still allow of the horizontal movement thereof.

In witness whereof I affix my signature in the presence of two witnesses.

JACOB T. ONSTOTT.

Witnesses:
 FLORENCE HEWITT,
 A. H. HEWITT.

Copies of this patent may be obtained for five cents each, by addressing the "Commissioner of Patents, Washington, D. C."